L. BOZZO.
HARNESS MOTION FOR LOOMS.
APPLICATION FILED OCT. 4, 1919.
1,333,060.
Patented Mar. 9, 1920.
3 SHEETS—SHEET 2.
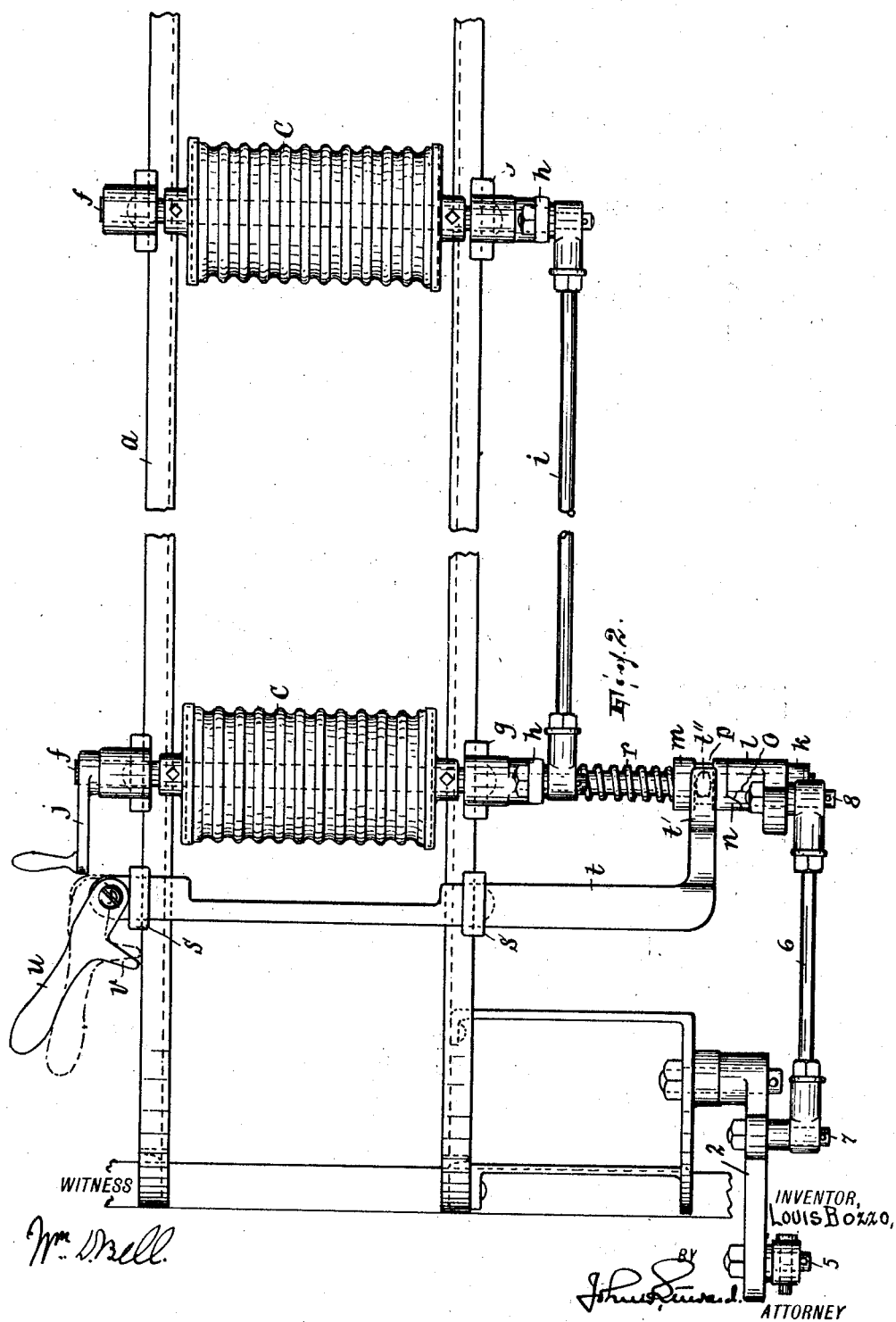

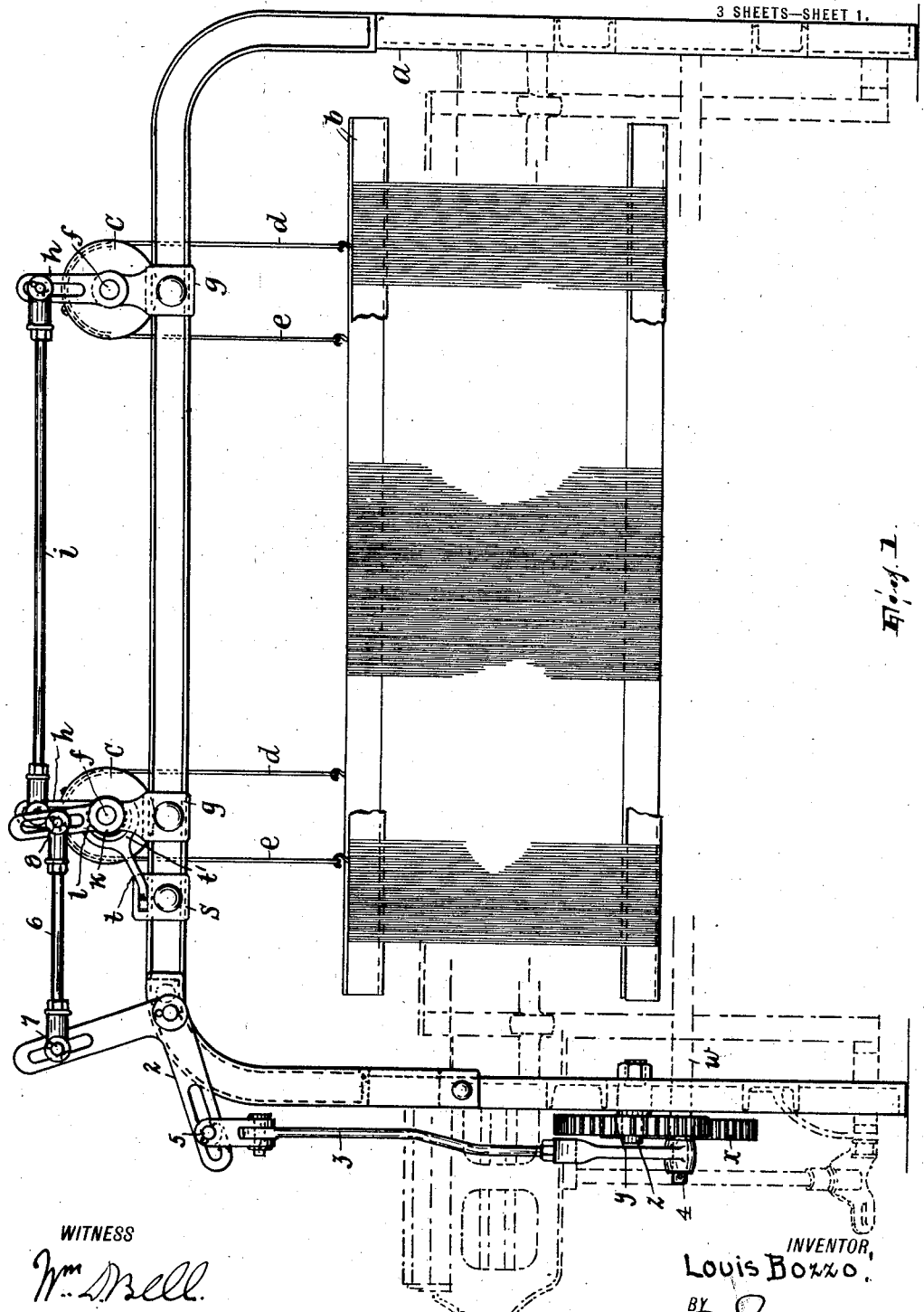

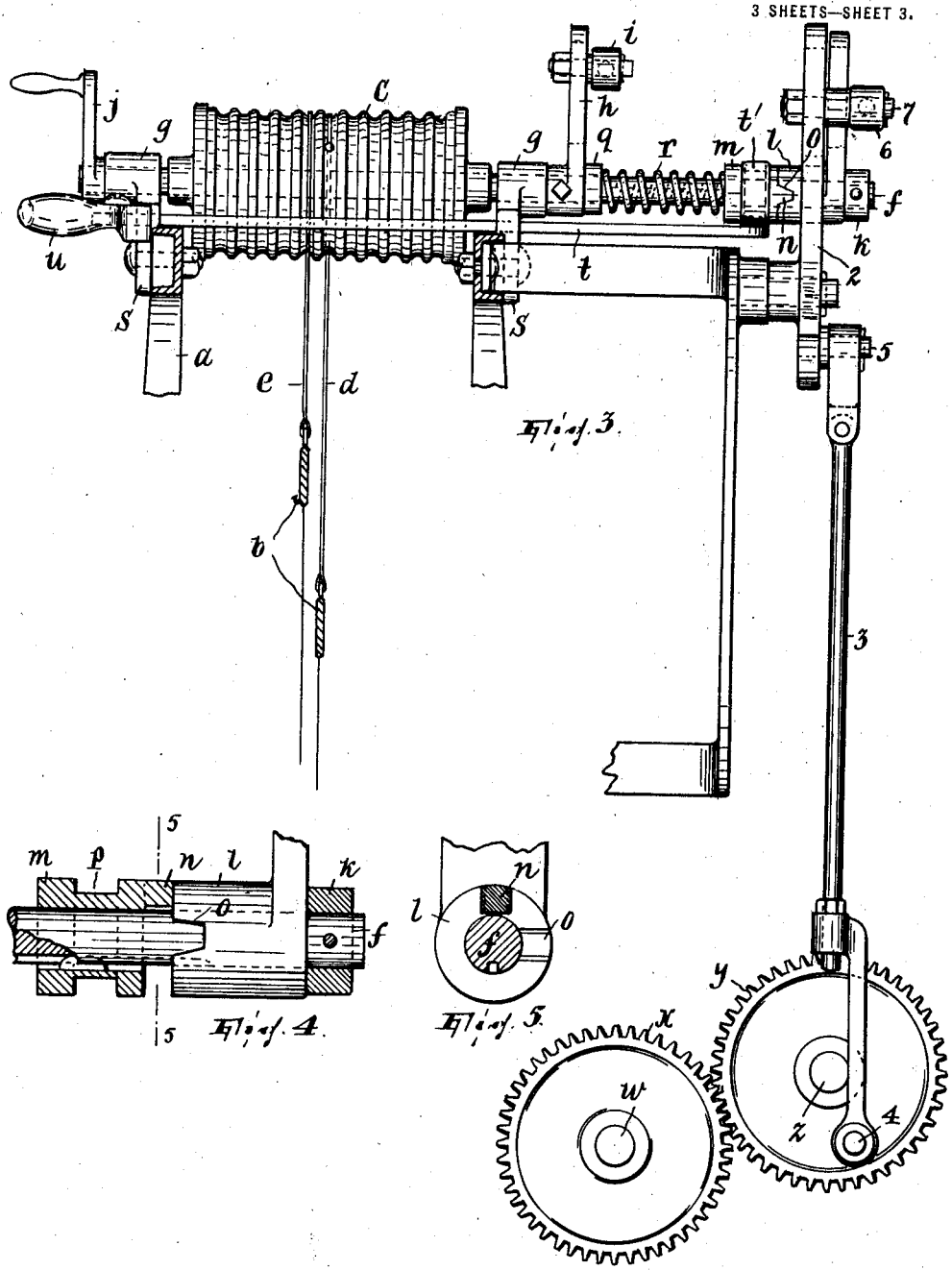

UNITED STATES PATENT OFFICE.

LOUIS BOZZO, OF PATERSON, NEW JERSEY.

HARNESS-MOTION FOR LOOMS.

1,333,060.   Specification of Letters Patent.   Patented Mar. 9, 1920.

Application filed October 4, 1919. Serial No. 328,343.

*To all whom it may concern:*

Be it known that I, LOUIS BOZZO, a citizen of the United States, residing at Paterson, in the county of Passaic and State of New Jersey, have invented certain new and useful Improvements in Harness-Motions for Looms, of which the following is a specification.

This invention relates to harness motions for looms and its object is to provide a harness motion for use in connection with plain looms which can be leveled with greater facility than can ordinary harness motions comprising a dobby and means therein to effect the leveling.

In the accompanying drawings,

Figure 1 is a rear elevation of a loom including the improved harness motion;

Fig. 2 is a plan;

Fig. 3 is a side elevation; and

Figs. 4 and 5 illustrate details.

$a$ designates the frame and $b$ the harness frames; only two harness frames are shown, but it will be understood that there will usually be two sets of harness frames to reciprocate in opposite directions, this latter being accomplished by (preferably) a pair of rollers $c$ journaled on parallel and horizontal axes as hereinafter explained, $d$ and $e$ being flexible connections which extend from the respective sets of harness frames upwardly to and in opposite directions around the rollers $c$ and are secured to the latter, so that when the rollers are oscillated in synchrony the desired reciprocation of the harness frames in opposite directions will ensue.

The rollers $c$ are fixed to horizontal shafts $f$ which are journaled in the brackets $g$ secured to the loom frame $a$, and on these shafts are secured cranks $h$ which may be connected by the link $i$, whereby the rollers are caused to oscillate in synchrony.

The shaft $f$ of one roller is equipped at one end with a crank $j$ for turning it by hand. At its other end this shaft is prolonged, and carries a fixed collar $k$. The collar is abutted by a clutch member $l$ which may be formed as a crank and is revoluble on the shaft; abutting the inside face of clutch member $l$ is a clutch member $m$ splined on the shaft and having a tooth $n$ to engage a notch $o$ in clutch member $l$ and also having a peripheral groove $p$. On said shaft between clutch member $m$ and a loose collar $q$ abutting the crank $h$ is also a spring $r$ which normally holds clutch member $m$ pressing against clutch member $l$.

In brackets $s$ a slide $t$ is arranged to move parallel with the axes of the oscillating members formed by the rollers $c$ and their shafts $f$ and close to the one of these members which is equipped with the clutch means just described. It has one end formed as a fork $t'$ equipped with pins $t''$ engaged in the groove $p$ of clutch member $m$, its other end having pivoted thereto a handle $u$ having a toe $v$ which projects toward the frame and forms a fulcrum for the lever which said handle then constitutes.

On the tappet shaft $w$ of the loom is a gear $x$ in mesh with a gear $y$ journaled on a stud $z$. At the top of the loom frame is a bell crank lever 2. 3 is a suitable connection between a wrist pin 4 on the gear $y$ and a stud 5 on the lever 2, and 6 a suitable connection between the studs 7 and 8 of said lever and the crank of clutch member $l$.

The normal position of the parts is that shown in the drawings. Through the described connections between the gear $x$ and the clutch member $l$ the aforesaid oscillating members to which the harness frames are connected will be oscillated in the regular way when shaft $w$ is in motion. If the weaver desires to level the harness, the loom being then stopped, he presses on the handle $u$ so as to withdraw the clutch member $m$ out of interlocking engagement with clutch member $l$, whereupon with his other hand and by means of crank $j$ he turns the oscillating members in the proper direction to effect the leveling. To reset the mechanism, the crank is turned until the tooth $n$ registers with recess $o$ when by means of the spring clutch member $m$ will become again interlocked with clutch member $l$.

It will be observed that the handle $u$ and crank $j$ are placed at the front of the loom, the position most convenient to the weaver when in order to locate a missing "end" he has to resort to leveling the harness.

Having thus fully described my invention, what I claim as new and desire to secure by Letters Patent is:—

In a harness motion for looms, the combination, with the frame, of a pair of harness frames, an oscillating member journaled in the frame and connections between the same and the harness frames for reciprocating the latter in reverse directions, said member having a manual device at one end for turning the same in either direction, a going driving member, means, including a disconnective clutch, for transmitting motion from said driving member to the oscillating member, and a control device for the clutch guided in said frame for movement longitudinally of the axis of the oscillating member and having an operating handle near the manual device.

In testimony whereof I affix my signature.

LOUIS BOZZO.